United States Patent
Roy et al.

(10) Patent No.: US 10,866,993 B2
(45) Date of Patent: Dec. 15, 2020

(54) MANAGING ONLINE HELP INFORMATION IN A DATA CENTER

(71) Applicant: EMC IP HOLDING COMPANY LLC, Hopkinton, MA (US)

(72) Inventors: Mainak Roy, Kolkaa (IN); Chitrak Gupta, Bangalore (IN); Abhirup Seal, Kolkatta (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 15/969,857

(22) Filed: May 3, 2018

(65) Prior Publication Data
US 2019/0340253 A1 Nov. 7, 2019

(51) Int. Cl.
G06F 16/93 (2019.01)
G06F 16/22 (2019.01)
G06F 16/23 (2019.01)
G06F 16/2455 (2019.01)

(52) U.S. Cl.
CPC .............. *G06F 16/93* (2019.01); *G06F 16/22* (2019.01); *G06F 16/23* (2019.01); *G06F 16/24562* (2019.01)

(58) Field of Classification Search
CPC ....................................................... G06F 16/93
USPC ......................................................... 707/713
See application file for complete search history.

(56) References Cited

U.S. PATENT DOCUMENTS

| | | | | |
|---|---|---|---|---|
| 7,860,898 B1* | 12/2010 | Moranta | ............... | G06F 16/958 707/803 |
| 8,938,717 B1* | 1/2015 | Subramanian | .......... | G06F 8/658 717/123 |
| 2005/0120112 A1* | 6/2005 | Wing | ..................... | G06Q 10/06 709/224 |
| 2007/0033420 A1* | 2/2007 | Sherwani | ................ | G06F 21/57 713/193 |
| 2015/0169734 A1* | 6/2015 | Jain | ..................... | G06F 11/0793 707/742 |
| 2016/0004528 A1* | 1/2016 | Price | ........................ | G06F 8/65 717/173 |
| 2019/0171438 A1* | 6/2019 | Franchitti | ............... | H04L 67/34 |

* cited by examiner

*Primary Examiner* — Syling Yen
(74) *Attorney, Agent, or Firm* — Krishnendu Gupta; Lesley Leonessa

(57) ABSTRACT

A method is used in managing online help information in a data center. The method gathers a plurality of help information associated with a plurality of components operating in the data center. The method creates an integrated repository of online help information by indexing contents of the plurality of help information into an indexed data structure of a plurality of search expressions. Each search expression is associated with a set of online help documents. The integrated repository is accessible by each component. In response to a search query for an online help document, the method provides at least one help document relevant to the search query by searching the indexed data structure.

20 Claims, 6 Drawing Sheets

| SEARCH EXPRESSION | POSTING LIST AND LOOKUP LIST |
|---|---|
| ADDRESS | POSTING LIST (NOT SHOWN) |
| | LOOKUP LIST = [ IDRAC, IP, DNS ] |
| BIOS | POSTING LIST (NOT SHOWN) |
| | LOOKUP LIST = [ UPDATE, VERSION ] |
| DNS | POSTING LIST (NOT SHOWN) |
| | LOOKUP LIST = [ ] |
| FIRMWARE | POSTING LIST (NOT SHOWN) |
| | LOOKUP LIST = [ UPDATE, VERSION ] |
| IDRAC | POSTING LIST (NOT SHOWN) |
| | LOOKUP LIST = [ IP ] |
| IP | POSTING LIST (NOT SHOWN) |
| | LOOKUP LIST = [ ] |
| UPDATE | POSTING LIST (NOT SHOWN) |
| | LOOKUP LIST = [ ] |
| VERSION | POSTING LIST (NOT SHOWN) |
| | LOOKUP LIST = [ ] |

FIG. 4

MANAGING ONLINE HELP INFORMATION IN A DATA CENTER

BACKGROUND

Technical Field

This application relates to managing online help information in a data center.

Description of Related Art

Generally, searchable online help is conveniently integrated with a product, and is a highly useful feature, especially when a customer encounters a problem with the product. Typically, the customer searches the product specific online help to locate scenarios that match the customer's problem, and to find any troubleshooting instructions that may apply to the customer's situation.

Often, the customer's product may be integrated with multiple $3^{rd}$ party products which may be critical for business. Any of the $3^{rd}$ party products may be related to critical issues that a customer may need to resolve. In this scenario, the customer may search the online help for multiple products before determining what troubleshooting steps to undertake.

SUMMARY OF THE INVENTION

In accordance with one aspect of the invention is a method is used in managing online help information in a data center. The method gathers a plurality of help information associated with a plurality of components operating in the data center. The method creates an integrated repository of online help information by indexing contents of the plurality of help information into an indexed data structure of a plurality of search expressions, where each search expression is associated with a set of online help documents, and where the integrated repository is accessible by each component. In response to a search query for an online help document, the method provides at least one help document relevant to the search query by searching the indexed data structure.

In accordance with one aspect of the invention is a system is used in managing online help information in a data center. The system gathers a plurality of help information associated with a plurality of components operating in the data center. The system creates an integrated repository of online help information by indexing contents of the plurality of help information into an indexed data structure of a plurality of search expressions, where each search expression is associated with a set of online help documents, and where the integrated repository is accessible by each component. In response to a search query for an online help document, the system provides at least one help document relevant to the search query by searching the indexed data structure.

In accordance with another aspect of the invention, a computer program product comprising a computer readable medium is encoded with computer executable program code. The code enables execution across one or more processors for managing online help information in a data center. The code gathers a plurality of help information associated with a plurality of components operating in the data center. The code creates an integrated repository of online help information by indexing contents of the plurality of help information into an indexed data structure of a plurality of search expressions, where each search expression is associated with a set of online help documents, and where the integrated repository is accessible by each component. In response to a search query for an online help document, the code provides at least one help document relevant to the search query by searching the indexed data structure.

BRIEF DESCRIPTION OF THE DRAWINGS

Features and advantages of the present technique will become more apparent from the following detailed description of exemplary embodiments thereof taken in conjunction with the accompanying drawings in which:

FIG. 4 is an illustration of indexed data structure of search expressions, in accordance with an embodiment of the present disclosure.

DETAILED DESCRIPTION OF EMBODIMENT(S)

Figure 1:
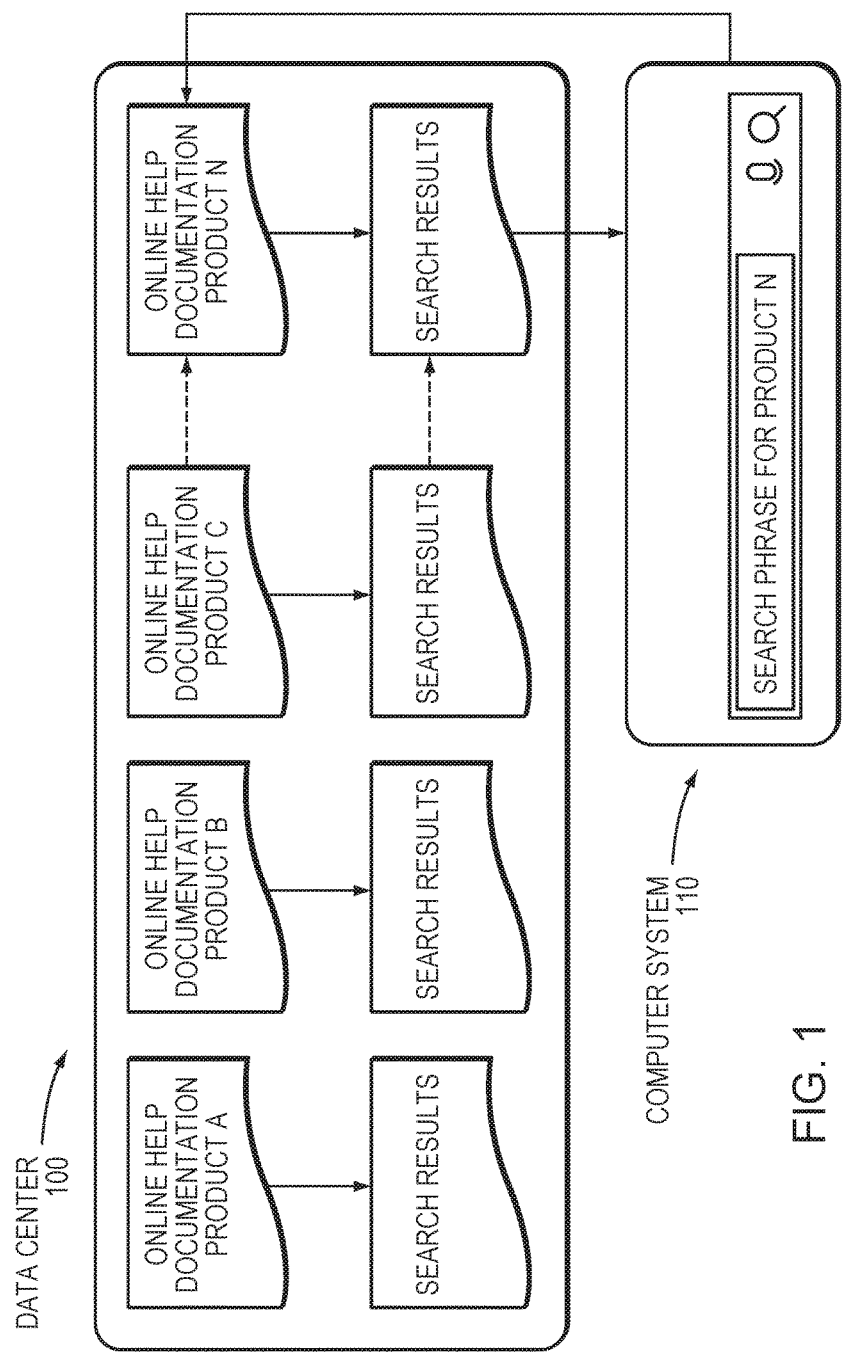
FIG. 1 is a simplified illustration of a conventional search in online help information in a data center.

Described below is a technique for use in managing online help information in a data center, which technique may be used to provide, among other things gathering a plurality of help information associated with a plurality of components operating in the data center, creating an integrated repository of online help information by indexing contents of the plurality of help information into an indexed data structure of a plurality of search expressions, where each search expression is associated with a set of online help documents, and where the integrated repository is accessible by each component, and in response to a search query for an online help document, providing at least one help document relevant to the search query by searching the indexed data structure.

Typically, when troubleshooting a problem, it is necessary to visit product specific online help documentation to look for scenarios that may address the problem. In many instances, the solution may require reviewing online help documentation for multiple products to locate a solution. Each trouble shooting scenario may require a unique solution, and may require pulling together the online help documentation from multiple products (and, often multiple online help documentation for each of the multiple products) to first define the problem, and then identify the solution. A hybrid data center may be responsible for providing trouble shooting guidance for multiple $3^{rd}$ party products. This means a customer support service provider may be faced with locating and reviewing online help documentations for multiple products from multiple sources in an attempt to identify the source of a problem, and a resolution.

As described herein, in at least one embodiment of the current technique, the method gathers a plurality of help information associated with a plurality of components operating in a data center to create an integrated repository of online help information. The integrated repository is created by indexing contents of the plurality of help information into an indexed data structure of a plurality of search expressions, where each search expression is associated with a set of online help documents. The integrated repository is accessible by each component. In response to a search query for an online help document, the method provides at least one help document relevant to the search query by searching the indexed data structure. In other words, the online help documents associated with multiple products are indexed together by search expressions, so that one search provides the necessary documentation instead of having to search the online documentation for each product separately.

Conventional technologies require a customer support service provider to search different forums, and different online help documentation to determine the source of the problem, and develop a solution. Conventional technologies do not gather online help documents from multiple sources, and integrate them into a single repository of online help information indexed by search expressions. Conventional technologies do not provide a connected solution, for example, a solution for obtaining updates for a first product, while also including updates for any additional products that are bundled in along with the first product. Conventional technologies do not provide a dynamic, real time integrated repository that responds to additions and deletions of products within a data center.

By contrast, in at least some implementations in accordance with the current technique as described herein, a method gathers a plurality of help information associated with a plurality of components operating in the data center. The method creates an integrated repository of online help information by indexing contents of the plurality of help information into an indexed data structure of a plurality of search expressions, where each search expression is associated with a set of online help documents, and where the integrated repository is accessible by each component. In response to a search query for an online help document, the method provides at least one help document relevant to the search query by searching the indexed data structure.

Thus, the goal of the current technique is to provide a method and a system for managing online help information in a data center and to provide a single integrated repository indexed by search expression that is dynamically maintained and available for all products in a data center.

In at least some implementations in accordance with the current technique described herein, the use of managing online help information in a data center can provide one or more of the following advantages: creating a dynamic searchable online help integrated repository for a node, several nodes, or the entire data center in real time, providing a real time online help database that is accessible by any node in the data center at any point in time, automatically detecting addition and/or removal of products and the associated online help documentation, automatically updating the integrated repository when the method detects any updates in the source of the online help documentation, providing a customized integrated repository for each data center and/or each node in a data center, and providing a faster search result through the use of the integrated repository.

In contrast to conventional technologies, in at least some implementations in accordance with the current technique as described herein, a method gathers a plurality of help information associated with a plurality of components operating in the data center. The method creates an integrated repository of online help information by indexing contents of the plurality of help information into an indexed data structure of a plurality of search expressions, where each search expression is associated with a set of online help documents, and where the integrated repository is accessible by each component. In response to a search query for an online help document, the method provides at least one help document relevant to the search query by searching the indexed data structure.

In an example embodiment of the current technique the integrated repository of online help information is updated dynamically in real time by updating the indexed data structure.

In an example embodiment of the current technique, the method detects a change in the plurality of help information, and updates the integrated repository of online help information based on the detected change.

In an example embodiment of the current technique, the method detects at least one of an addition of a component to the plurality of components and a removal of a component from the plurality of components. Based on the detection, the method determines whether the integrated repository online help information needs to be updated. Based on the determination, the method updates the integrated repository online help information.

In an example embodiment of the current technique, the method creates a lookup list associated with the indexed data structure by parsing at least one online help document in the plurality of help information for locating search expressions likely to comprise a searched phrase. The method creates a posting list associated with each search expression in the indexed data structure, where the posting list includes a set of online help documents and information regarding occurrence of the respective search expression in each online help document.

In an example embodiment of the current technique, when the method provides at least one help document relevant to the search query by searching the indexed data structure, the method receives the search query, where the search query is comprised of a set of search expressions. The method gathers a set of matching posting lists by searching each search expression of the set of search expressions in the indexed data structure. The method sorts the matching posting lists by ranking online help documents included in the matching posting lists based on relevance of each online help document to the search query.

In an example embodiment of the current technique, when the method receives the search query, the method sorts the search query prior to searching at least one of the indexed data structure and the lookup list.

In an example embodiment of the current technique, the method searches a first search expression of the search query in the indexed data structure. The method searches a second search expression of the search query in the indexed data structure upon determining that the second search expression is not located in the lookup list associated with the first search expression.

In an example embodiment of the current technique, when the method searches the second search expression in the indexed data structure upon determining that the second search expression is not located in the lookup list associated with the first search expression, the method identifies, in the lookup list, a pointer to a location in the indexed data structure associated with the second search expression.

Referring now to FIG. 1, shown is a simplified illustration of a conventional search in online help information in a data center 100. Each of the Products A through N have online help documentation related to each respective product. In an example embodiment, at least one of the respective online help documentation is integrated with each respective product. In another example embodiment, at least one of the respective online help documentation is available via the Internet. In an example embodiment, a user (not shown) enters a search phrase, for example, "Search phrase for Product N" into a computerized device 110 that searches the online help documentation for Product N. The search results for Product N are returned to the user on the computerized device 110.

A customer (not shown) may be running a hybrid system comprised of, for example, Product A, Product B, and Product N. If the customer encounters a problem, the customer may be required to search the online help, separately, for Product A, Product B, and Product N. Or, if the customer contacts a help data center, the customer service support provider assigned to assist the customer has to search the online help, separately, for Product A, Product B, and Product N. There may also be multiple sources for the online help documentation for each of Product A, Product B, and Product N. Thus, the customer, or customer service support provider may have to search each of the multiple sources for each of Product A, Product B, and Product N to troubleshoot the problem, and then connect the various sources of online help documentation to locate a solution.

Figure 2:
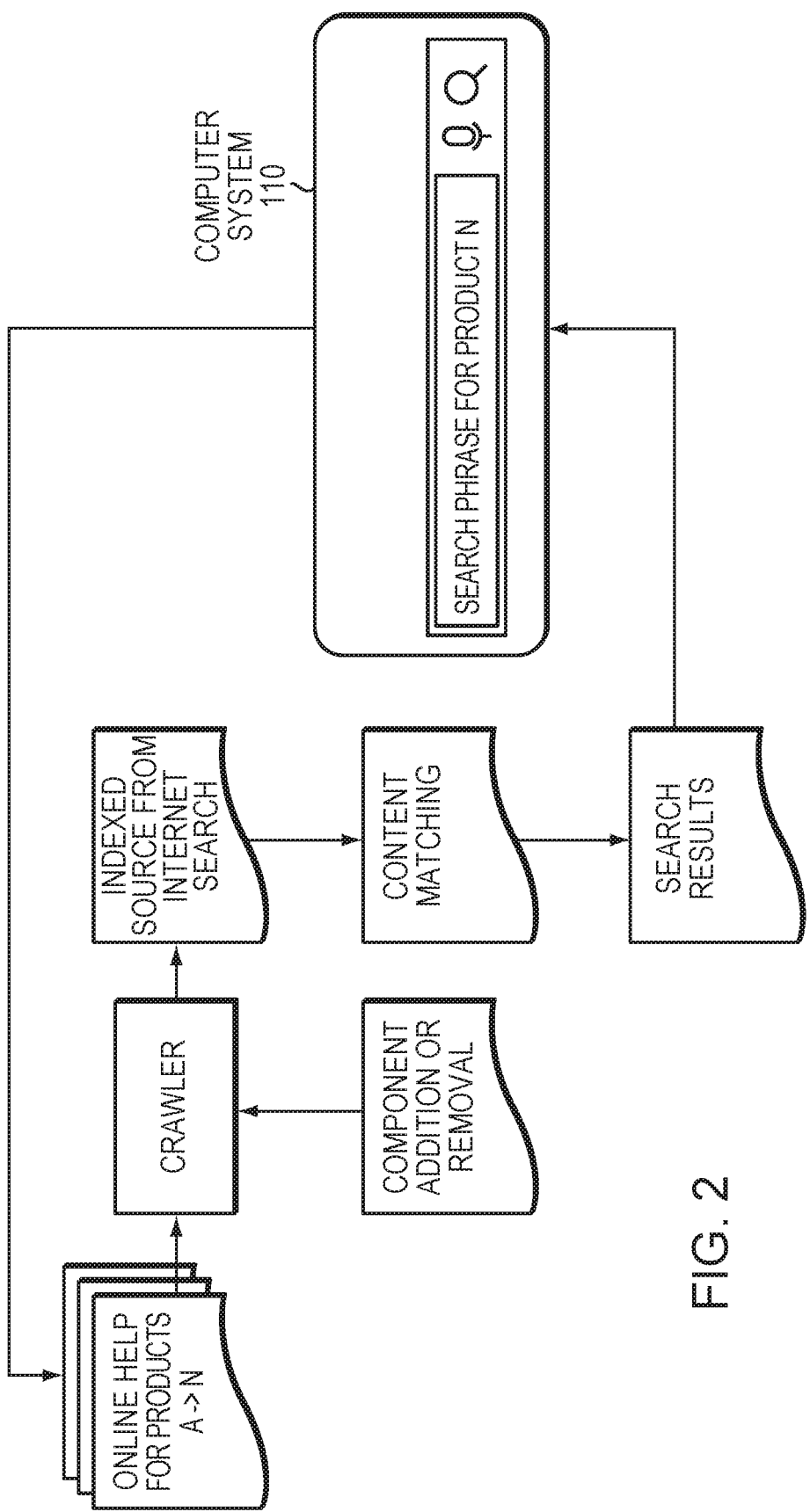
FIG. 2 is a simplified illustration of an optimized search in online help information in a data center, in accordance with an embodiment of the present disclosure.

FIG. 2 is a simplified illustration of an optimized search in online help information in a data center, in accordance with an embodiment of the present disclosure. A crawler searches the online help documentation, for example, for Products A through N. In an example embodiment, the method indexes the source(s) from an Internet search. The method creates the integrated repository of online help information by indexing contents of the plurality of help information into an indexed data structure of a plurality of search expressions. The method matches content from among the online help documentation for different products. When a customer or a customer support service provider (not shown) performs a search query for an online help document, the method provides at least one help document relevant to the search query by searching the indexed data structure. In an example embodiment, the method updates the integrated repository of online help information based on a detected change in the corpus of online help documents, for example, when a product is added to or removed from the group of products supported by a data center.

Figure 3:
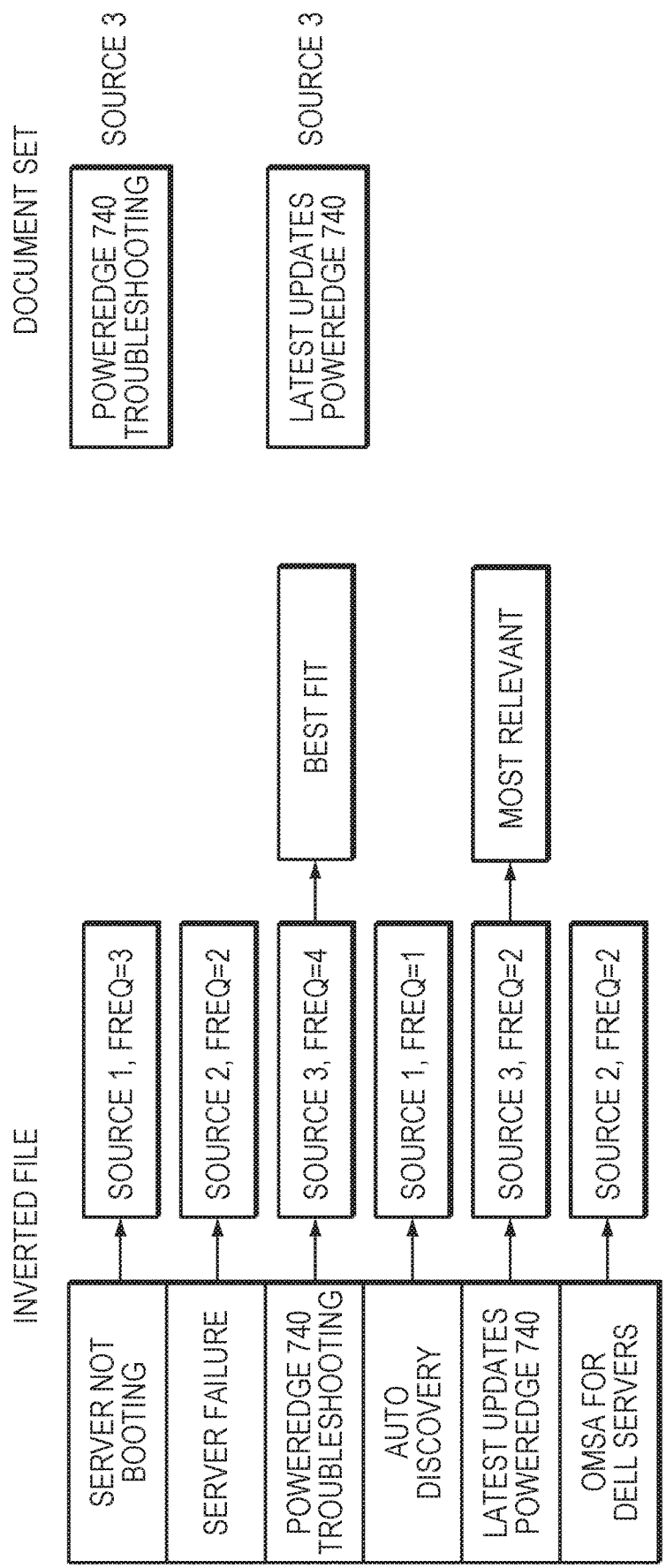
FIG. 3 is an illustration of creation of the integrated repository of online help information, in accordance with an embodiment of the present disclosure.

FIG. 3 is an illustration of creation of the integrated repository of online help information through the use of an inverted file, in accordance with an embodiment of the present disclosure. In an example embodiment, the integrated repository of online help information is created using inverted files. In an example embodiment, the inverted file is an indexed data structure of words, where each word is associated with a posting list (i.e., a list of relevant online help documents). Additional information, such as how many times a particular word appears in a particular document, in which position the word appears, etc., may also be included. In an example embodiment, for a search query, each word in the search query is searched in the index, and the matching posting lists are fetched. The matching posting lists are used to rank the online help documents that are most relevant to the search query. FIG. 3 illustrates different search query strings that may be used to search for "PowerEdge740" troubleshooting information. The document set illustrates the online help documents that were determined to be the "Best Fit" document and the "Most Relevant" document, based on the ranking. In this example embodiment, the documents that were determined to be the "Best Fit" document and the "Most Relevant" document originated from "Source 3".

FIG. 4 is an illustration of indexed data structure of search expressions, in accordance with an embodiment of the present disclosure. In an example embodiment, the indexed data structure of search expressions comprises a posting list and a look up list. In an example embodiment, the lookup list is a smaller index data structure that has pointers to locations in the indexed data structure associated with the search expression. The pointers accelerate the search result, and result in a fast lookup for a relevant document search. In an example embodiment, the lookup list may be created using a term to term correlation matrix, selecting terms that have a correlation value above a threshold.

Figure 5:
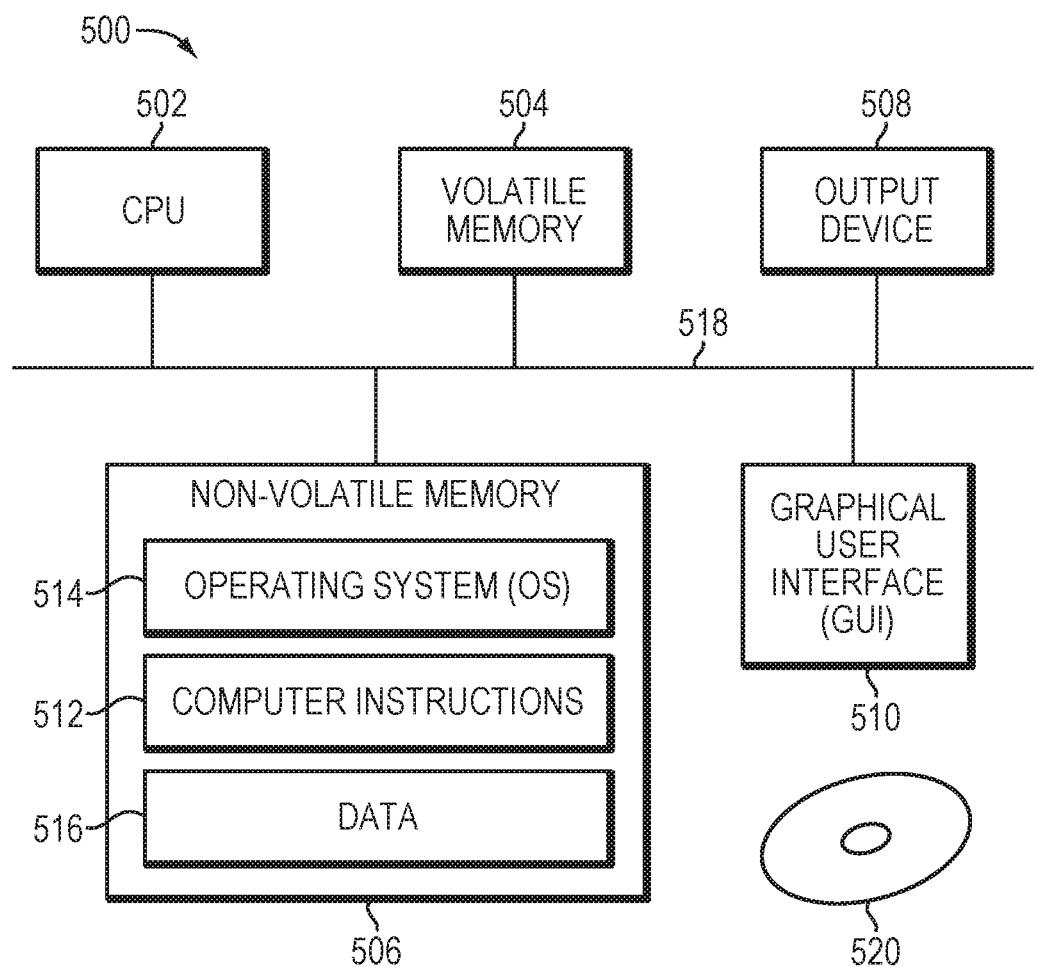
FIG. 5 is a block diagram of a computer, in accordance with an embodiment of the present disclosure.

FIG. 5 illustrates a block diagram of a computer 500 that can perform at least part of the processing described herein, according to one embodiment. The computer 500 may include a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 may be configured to store computer instructions 512, an operating system 514, and data 516. In one example, the computer instructions 512 are executed by the processor 502 out of volatile memory 504. In one embodiment, an article 520 comprises non-transitory computer-readable instructions. In some embodiments, the computer 500 corresponds to a virtual machine (VM). In other embodiments, the computer 500 corresponds to a physical computer.

Figure 6:
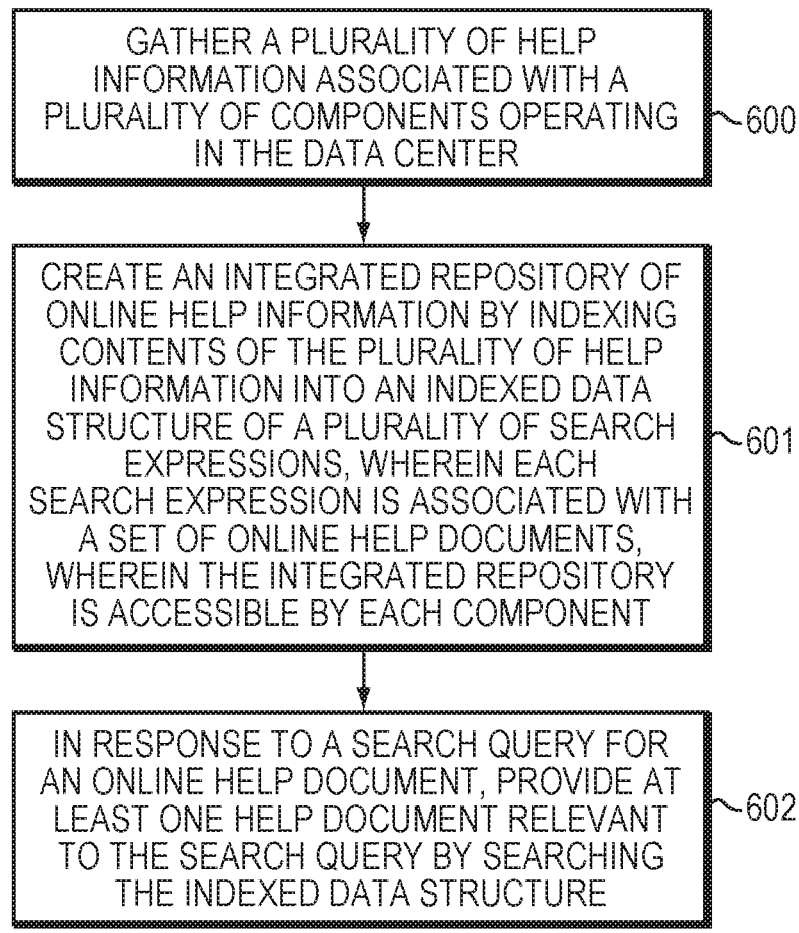
FIG. 6 is a flow diagram illustrating processes that may be used in connection with techniques disclosed herein.

Referring to FIG. 6, shown is a more detailed flow diagram illustrating managing online help information in a data center. With reference also to FIGS. 1-5, a computerized device executing the method gathers a plurality of help information associated with a plurality of components operating in the data center (Step 600). In an example embodiment, online help documents for various products are gathered together to form a corpus of documents. The documents may be gathered for a single node within a data center, or for several nodes, or the entire data center. In an example embodiment, the online help documentation may be integrated with a product, or the method may have to locate the online help documentation via the Internet.

In an example embodiment, the method creates an integrated repository of online help information by indexing contents of the plurality of help information into an indexed data structure of a plurality of search expressions, where each search expression is associated with a set of online help documents, and where the integrated repository is accessible by each component (Step 601). In an example embodiment, the integrated repository of online help information may be created for a single node within a data center, or for several nodes, or the entire data center. The method creates a dynamic search able online help integrated repository for a node, several nodes, or the entire data center in real time. The integrated repository may be modified in real time, as products (and the associated online help documentation) are added, and/or deleted. Additionally, the method automatically updates the integrated repository when the method detects any updates in the source of the online help documentation.

In an example embodiment, the method creates a lookup list associated with the indexed data structure by parsing at least one online help document in the plurality of help information to locate search expressions likely to comprise a searched phrase. In an example embodiment, the lookup list is created using mathematical models, for example, finding correlations between terms and then using highly correlated terms, or query log mining which may provide frequently co-occurring search queries. Below is an example of a look up list created using a term to term correlation matrix, selecting terms that have a correlation value above a threshold:
address→['system']
addresses→['system']
bios→['system']
boot→['system']
cold→['system']
console→['system']
dns→['system']
domain→['system']
express→['system']
fans→['system']
firmware→['idrac', 'name', 'power', 'launch', 'system', 'server', 'service', 'operating', 'version']
idrac→['version', 'system', 'power']
ip→['system']
name→['version', 'system', 'power']
on/off→['system']
operating→['version', 'system', 'power']
power→['version', 'system', 'service', 'server']
system→['tasks', 'version', 'update', 'virtual', 'voltages', 'tag', 'temperatures', 'view']

The method creates a posting list associated with each search expression in the indexed data structure. The posting list includes a set of online help documents and information regarding occurrence of the respective search expression in each online help document.

In an example embodiment, the integrated repository of online help information is updated dynamically in real time by updating the indexed data structure. For example, the method may detect a change in the plurality of help information. In an example embodiment, the method detects at least one of an addition of a component to the plurality of components and a removal of a component from the plurality of components. Or, the method may determine that online help documentation has been updated. Based on the detection, the method determines whether the integrated repository online help information needs to be updated, and based on the determination, the method updates the integrated repository online help information. In other words, as products and/or components are added to, removed from, or updated, for example, the data center, the method detects these changes, and updates the indexed data structure in real time. In response, the method updates the integrated repository of online help information based on the detected change. In an example embodiment, the online help documentation is integrated with software and/or hardware components. Thus, a change in software and/or hardware components results in a change in the online help information. In an example embodiment, the method updates the lookup list based on the online help information that was added or removed due to the change in products and/or components. Further, addition of a new software and/or hardware component may also result in new correlations between the online help documentation associated with the new software and/or hardware component and the existing components in the data center.

In an example embodiment, an online help generator reads information from the Data center infrastructure management (DCIM) periodically to determine whether any components have been added or deleted, for example, within a specific node, or within the data center. The DCIM maintains information related to the devices and their integrated components within the data center. In an example embodiment, the online help generator is integrated within the DCIM which provides information associated with the physical infrastructure of the data center. Integrating the online help generator within the DCIM optimizes the real time production and update of the indexed data structure. The DCIM provides the online help generator with system details for each of the nodes that are connected at any given point in time.

In an example embodiment, the method checks the Core and Non-Core device tables to determine if the information is required for the customized online help information. Examples of Core devices include, but are not limited to, network switches, servers, peripherals, network interface card connected components, add on cards, monitors, etc. Examples of Non-Core devices include, but are not limited to, external mass storage, Universal Serial Bus (USB) devices, pen drives, plug and play devices, etc.

In an example embodiment, in response to a search query for an online help document, the method provides at least one help document relevant to the search query by searching the indexed data structure (Step 602). In an example embodiment, the method receives the search query, where the search query is comprised of a set of search expressions. In an example embodiment, the method sorts the search query prior to searching at least one of the indexed data structure and the lookup list. In an example embodiment, the method searches for a first search expression of the search query in the indexed data structure. The method searches for a second search expression of the search query in the lookup list of the first search expression. The method searches a second search expression of the search query in the indexed data structure upon determining that the second search expression is not located in the lookup list associated with the first search expression. In other words, if the second search expression of the search query is not found in the lookup list of the first search expression, the method searches for the second search expression in the indexed data structure. Further, a third search expression would be searched for in the lookup lists of the first and second search expression, and if not found, the method would search for the third search expression in the indexed data structure. In an example embodiment, the method identifies, in the lookup list, a pointer to a location in the indexed data structure associated with the second search expression to accelerate the search result. Thus, the search algorithm is tuned for embedded applications, and creates a fast lookup for a relevant document search. The result of the query search is completed faster due to use of the lookup list.

In an example embodiment, the method gathers a set of matching posting lists by searching each search expression of the set of search expressions in the indexed data structure. In other words, for every term in the search query, the index is searched, and matching posting lists are fetched. The method then sorts the matching posting lists by ranking online help documents included in the matching posting lists based on relevance of each online help document to the search query. The method then returns the selected online help documents that are determined to be relevant to the search query.

In an example embodiment, the method returns a programmatically consumable Extensible Markup Language (XML) file that can be used by any console or interface. For example, embodiments disclosed herein may be used as a standalone product for any online help information, any data center, any node in a data center, etc. In an example embodiment, the method provides a graphical user interface where a user enters the search query. In another example embodiment, the user uses an existing user interface, for example, the user interface that the data center used previously to installing the application that executes the method described herein. In an example embodiment, the method may execute as a standalone application, available to any component in the data center, and accessible from any component in the data center. In another example embodiment, the method may have access to any node in the data center.

There are several advantages to embodiments disclosed herein. For example, the method creates a dynamic searchable online help integrated repository for a node, several nodes, or the entire data center in real time. The method provides a real time online help database that is accessible by any node in the data center at any point in time. The method automatically detects addition, and/or removal of products and the associated online help information. The method automatically updates the integrated repository when the method detects any updates in the source of the online help information. The method provides a faster search result through the use of the integrated repository, and specifically, through the use of the lookup list.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing online help information in a data center, the method comprising:
    gathering a plurality of help information associated with a plurality of components operating in the data center, wherein subsets of the plurality of components are bundled together in products, wherein the plurality of components comprise embedded applications, wherein the data center supports the products, wherein the plurality of help information is comprised of online help documentation from a plurality of websites;
    creating an integrated repository of online help information by indexing contents of the plurality of help information into an indexed data structure of a plurality of search expressions, wherein each search expression is associated with a set of online help documents, wherein the integrated repository is accessible by each component, wherein the integrated repository is tuned for the embedded applications, wherein the integrated repository of online help information is updated dynamically in real time as a change in the plurality of help information associated with the products is detected; and
    in response to a search query for an online help document, providing at least one help document relevant to the search query by searching the indexed data structure, wherein the plurality of websites would otherwise have to be individually searched for each of the plurality of components bundled together.

2. The method of claim 1, wherein the integrated repository of online help information is updated dynamically in real time by updating the indexed data structure.

3. The method of claim 2, further comprising:
    detecting a change in the plurality of help information; and
    updating the integrated repository of online help information based on the detected change.

4. The method of claim 1, further comprising:
    detecting at least one of an addition of a component to the plurality of components and a removal of a component from the plurality of components;
    based on the detection, determining whether the integrated repository online help information needs to be updated; and
    based on the determination, updating the integrated repository online help information.

5. The method of claim 1, further comprising:
creating a lookup list associated with the indexed data structure by parsing at least one online help document in the plurality of help information for locating search expressions likely to comprise a searched phrase; and
creating a posting list associated with each search expression in the indexed data structure, wherein the posting list includes a set of online help documents and information regarding occurrence of the respective search expression in each online help document.

6. The method of claim 5, wherein providing the at least one help document relevant to the search query by searching the indexed data structure comprises:
receiving the search query, wherein the search query is comprised of a set of search expressions;
gathering a set of matching posting lists by searching each search expression of the set of search expressions in the indexed data structure; and
sorting the matching posting lists by ranking online help documents included in the matching posting lists based on relevance of each online help document to the search query.

7. The method of claim 6, wherein receiving the search query comprises:
sorting the search query prior to searching at least one of the indexed data structure and the lookup list.

8. The method of claim 7, further comprising:
searching a first search expression of the search query in the indexed data structure; and
searching a second search expression of the search query in the indexed data structure upon determining that the second search expression is not located in the lookup list associated with the first search expression.

9. The method of claim 8, wherein searching the second search expression in the indexed data structure upon determining that the second search expression is not located in the lookup list associated with the first search expression comprises:
identifying, in the lookup list, a pointer to a location in the indexed data structure associated with the second search expression.

10. A system for use in managing online help information in a data center, the system comprising a processor configured to:
gather a plurality of help information associated with a plurality of components operating in the data center, wherein subsets of the plurality of components are bundled together in products, wherein the plurality of components comprise embedded applications, wherein the data center supports the products, wherein the plurality of help information is comprised of online help documentation from a plurality of websites;
create an integrated repository of online help information by indexing contents of the plurality of help information into an indexed data structure of a plurality of search expressions, wherein each search expression is associated with a set of online help documents, wherein the integrated repository is accessible by each component, wherein the integrated repository is tuned for the embedded applications, wherein the integrated repository of online help information is updated dynamically in real time as a change in the plurality of help information associated with the products is detected; and
in response to a search query for an online help document, provide at least one help document relevant to the search query by searching the indexed data structure, wherein the plurality of websites would otherwise have to be individually searched for each of the plurality of components bundled together.

11. The system of claim 10, wherein the integrated repository of online help information is updated dynamically in real time by updating the indexed data structure.

12. The system of claim 11, further configured to:
detect a change in the plurality of help information; and
update the integrated repository of online help information based on the detected change.

13. The system of claim 10, further configured to:
detect at least one of an addition of a component to the plurality of components and a removal of a component from the plurality of components;
based on the detection, determine whether the integrated repository online help information needs to be updated; and
based on the determination, update the integrated repository online help information.

14. The system of claim 10, further configured to:
create a lookup list associated with the indexed data structure by parsing at least one online help document in the plurality of help information for locating search expressions likely to comprise a searched phrase; and
create a posting list associated with each search expression in the indexed data structure, wherein the posting list includes a set of online help documents and information regarding occurrence of the respective search expression in each online help document.

15. The system of claim 14, wherein the processor configured to provide the at least one help document relevant to the search query by searching the indexed data structure is further configured to:
receive the search query, wherein the search query is comprised of a set of search expressions;
gather a set of matching posting lists by searching each search expression of the set of search expressions in the indexed data structure; and
sort the matching posting lists by ranking online help documents included in the matching posting lists based on relevance of each online help document to the search query.

16. The system of claim 15, wherein the processor configured to receive the search query is further configured to:
sort the search query prior to searching at least one of the indexed data structure and the lookup list.

17. The system of claim 16, further configured to:
search a first search expression of the search query in the indexed data structure; and
search a second search expression of the search query in the indexed data structure upon determining that the second search expression is not located in the lookup list associated with the first search expression.

18. The system of claim 17, wherein the processor configured to search the second search expression in the indexed data structure upon determining that the second search expression is not located in the lookup list associated with the first search expression is further configured to:
identify, in the lookup list, a pointer to a location in the indexed data structure associated with the second search expression.

19. A computer program product for managing online help information in a data center, the computer program product comprising:
a non-transitory computer readable storage medium having computer executable program code embodied therewith, the program code executable by a computer processor to:

gather a plurality of help information associated with a plurality of components operating in a data center, wherein subsets of the plurality of components are bundled together in products, wherein the plurality of components comprise embedded applications, wherein the data center supports the products, wherein the plurality of help information is comprised of online help documentation from a plurality of websites;

create an integrated repository of online help information by indexing contents of the plurality of help information into an indexed data structure of a plurality of search expressions, wherein each search expression is associated with a set of online help documents, wherein the integrated repository is accessible by each component, wherein the integrated repository is tuned for the embedded applications, wherein the integrated repository of online help information is updated dynamically in real time as a change in the plurality of help information associated with the products is detected; and in response to a search query for an online help document, provide at least one help document relevant to the search query by searching the indexed data structure, wherein the plurality of websites would otherwise have to be individually searched for each of the plurality of components bundled together.

20. The computer program product of claim 19, further configured to:

create a lookup list associated with the indexed data structure by parsing at least one online help document in the plurality of help information for locating search expressions likely to comprise a searched phrase; and create a posting list associated with each search expression in the indexed data structure, wherein the posting list includes a set of online help documents and information regarding occurrence of the respective search expression in each online help document.

* * * * *